(12) United States Patent
Igoris et al.

(10) Patent No.: US 7,763,375 B2
(45) Date of Patent: Jul. 27, 2010

(54) CURRENT INTERRUPT DEVICE FOR BATTERIES

(75) Inventors: Misiucenko Igoris, St. Petersburg (RU); Martsinovskiy Geory Artem'evich, St. Petersburg (RU); Chernov Boris Constantinovich, St. Petersburg (RU); Khorenyan Rostislav Grigorievich, St. Petersburg (RU); Nikolay Shkolnik, West Hartford, CT (US)

(73) Assignee: Eveready Battery Company, Inc., St. Louis, MO (US)

( * ) Notice: Subject to any disclaimer, the term of this patent is extended or adjusted under 35 U.S.C. 154(b) by 938 days.

(21) Appl. No.: 11/439,853

(22) Filed: May 24, 2006

(65) Prior Publication Data
US 2007/0275298 A1 Nov. 29, 2007

(51) Int. Cl.
H01M 10/50 (2006.01)
H01M 2/12 (2006.01)
H01M 2/00 (2006.01)

(52) U.S. Cl. .............................. 429/62; 429/53; 429/61; 429/54

(58) Field of Classification Search .................. 429/62, 429/53, 61, 54
See application file for complete search history.

(56) References Cited

U.S. PATENT DOCUMENTS

| | | | |
|---|---|---|---|
| 3,431,528 A | 3/1969 | Richard | |
| 3,546,024 A | 12/1970 | Niklas | |
| 3,622,397 A | 11/1971 | Belove | |
| 3,647,557 A | 3/1972 | Kegelman | |
| 3,933,526 A | 1/1976 | Rackin | |
| 4,011,366 A | 3/1977 | Bones et al. | |
| 4,035,552 A | 7/1977 | Epstein | |
| 4,048,392 A | 9/1977 | Garoutte | |
| 4,166,157 A | 8/1979 | McCormick | |
| 4,430,392 A | 2/1984 | Kelley et al. | |
| 4,451,542 A | 5/1984 | Ishida et al. | |
| 4,507,368 A | 3/1985 | Hashimoto | |
| 4,529,673 A | 7/1985 | Zupancic | |
| 4,623,599 A | 11/1986 | Vourlis | |

(Continued)

FOREIGN PATENT DOCUMENTS

CN 1665045 9/2005

(Continued)

OTHER PUBLICATIONS

Patent Coopertion Treaty (PCT), Interntional Search Report and Written Opinion for Application PCT/US2007/012379 filed May 23, 2007, mailed Jan. 21, 2008, 13 pgs., European Patnet Office, Netherlands.

(Continued)

*Primary Examiner*—Dah-Wei Yuan
*Assistant Examiner*—Angela J. Martin
(74) *Attorney, Agent, or Firm*—Robert C. Baraona

(57) ABSTRACT

The invention is a battery containing at least one electrochemical cell having a sealing plate with a pressure relief vent, the sealing plate being part of an electrical circuit between one of the electrodes and the corresponding terminal under normal conditions but capable of changing shape to break the circuit without the cell venting when the temperature of the sealing plate rises to a predetermined level and then returning to its original shape to reestablish the broken circuit when the sealing plate temperature returns to a normal level.

9 Claims, 2 Drawing Sheets

U.S. PATENT DOCUMENTS

| | | |
|---|---|---|
| 4,725,515 A | 2/1988 | Jurca |
| 4,783,383 A | 11/1988 | Machida et al. |
| 4,855,195 A | 8/1989 | Georgopoulos et al. |
| 4,952,330 A | 8/1990 | Leger et al. |
| 4,963,446 A | 10/1990 | Roels et al. |
| 4,975,341 A | 12/1990 | Tucholski et al. |
| 4,977,042 A | 12/1990 | Chiyajo et al. |
| 4,992,339 A | 2/1991 | Georgopoulos |
| 5,008,161 A | 4/1991 | Johnston |
| 5,015,542 A | 5/1991 | Chaney, Jr. et al. |
| 5,043,235 A | 8/1991 | Seefeldt et al. |
| 5,156,930 A | 10/1992 | Daio et al. |
| 5,208,119 A | 5/1993 | Ducan |
| 5,376,467 A | 12/1994 | Abe et al. |
| 5,418,084 A | 5/1995 | Georgopoulos |
| 5,496,654 A | 3/1996 | Perkins |
| 5,523,178 A | 6/1996 | Murakami et al. |
| 5,532,075 A | 7/1996 | Alexandres et al. |
| 5,609,972 A | 3/1997 | Kaschmitter et al. |
| 5,624,771 A | 4/1997 | Sano et al. |
| 5,656,392 A | 8/1997 | Sano et al. |
| 5,677,076 A | 10/1997 | Sato et al. |
| 5,691,073 A | 11/1997 | Vu et al. |
| 5,741,606 A | 4/1998 | Mayer et al. |
| 5,747,187 A | 5/1998 | Byon |
| 5,766,790 A | 6/1998 | Kameishi et al. |
| 5,766,793 A | 6/1998 | Kameishi et al. |
| 5,821,008 A | 10/1998 | Harada et al. |
| 5,853,912 A | 12/1998 | Naing et al. |
| 5,879,832 A | 3/1999 | Vu et al. |
| 6,025,091 A | 2/2000 | Kondo et al. |
| 6,037,071 A * | 3/2000 | Poirier et al. .................. 429/7 |
| 6,045,939 A | 4/2000 | Tateno et al. |
| 6,078,244 A | 6/2000 | Quinn et al. |
| 6,083,639 A | 7/2000 | McHugh et al. |
| 6,084,501 A | 7/2000 | Plasko |
| 6,204,635 B1 | 3/2001 | Sullivan |
| 6,274,264 B1 | 8/2001 | Azema |
| 6,296,965 B1 | 10/2001 | Azema |
| 6,342,826 B1 | 1/2002 | Quinn et al. |
| 6,489,062 B1 | 12/2002 | Watanabe et al. |
| 6,570,749 B1 | 5/2003 | Ling et al. |
| 6,610,437 B2 | 8/2003 | Tsurutani et al. |
| 6,610,438 B2 | 8/2003 | Okumura et al. |
| 6,620,544 B1 | 9/2003 | Shin et al. |
| 6,633,222 B2 | 10/2003 | Nagai et al. |
| 2002/0068221 A1 | 6/2002 | Watanabe et al. |
| 2002/0127467 A1 | 9/2002 | Watanabe et al. |
| 2005/0153172 A1 | 7/2005 | Han |
| 2005/0153195 A1 | 7/2005 | Han |
| 2005/0153208 A1 | 7/2005 | Konishiike et al. |
| 2005/0175889 A1 | 8/2005 | Han |
| 2005/0191549 A1 | 9/2005 | Kang et al. |
| 2005/0221130 A1 | 10/2005 | Yoon |
| 2005/0221173 A1 | 10/2005 | Tatebayashi et al. |
| 2005/0221175 A1 | 10/2005 | Yoon |
| 2005/0244706 A1 | 11/2005 | Wu et al. |
| 2005/0266279 A1 | 12/2005 | Kim |
| 2005/0266302 A1 | 12/2005 | Kim |
| 2006/0073375 A1 | 4/2006 | Hong et al. |
| 2006/0093903 A1 | 5/2006 | Hong et al. |
| 2006/0121336 A1 | 6/2006 | Yoon |

FOREIGN PATENT DOCUMENTS

| | | | |
|---|---|---|---|
| DE | 69707455 | | 5/2002 |
| EP | 0377501 | A2 | 7/1990 |
| EP | 0975042 | A2 | 1/2000 |
| EP | 1035598 | A1 | 9/2000 |
| GB | 1452147 | | 10/1976 |
| JP | 55-111063 | A | 8/1980 |
| JP | 59-191273 | | 10/1984 |
| JP | 63-072062 | | 4/1988 |
| JP | 63-175345 | | 7/1988 |
| JP | 01-175164 | | 7/1989 |
| JP | 05-205727 | * | 8/1993 |
| JP | 05-325920 | | 12/1993 |
| JP | 1994-231743 | A | 8/1994 |
| JP | 1996-077995 | A | 3/1996 |
| JP | 1996-138686 | A | 5/1996 |
| JP | 08-185849 | | 7/1996 |
| JP | 08-236102 | | 9/1996 |
| JP | 1996-321287 | A | 12/1996 |
| JP | 1997-161753 | A | 6/1997 |
| JP | 10-074500 | | 3/1998 |
| JP | 1998-097852 | A | 4/1998 |
| JP | 10-125304 | | 5/1998 |
| JP | 10-125305 | | 5/1998 |
| JP | 10-154530 | | 6/1998 |
| JP | 10-255757 | | 9/1998 |
| JP | 10-261400 | | 9/1998 |
| JP | 1998-302740 | A | 11/1998 |
| JP | 10-326610 | | 12/1998 |
| JP | 10-334875 | | 12/1998 |
| JP | 11-007931 | | 1/1999 |
| JP | 11-040203 | | 2/1999 |
| JP | 11-040204 | | 2/1999 |
| JP | 1999-086819 | A | 3/1999 |
| JP | 1999-111255 | A | 4/1999 |
| JP | 1999-224658 | A | 8/1999 |
| JP | 11-265699 | | 9/1999 |
| JP | 11-354100 | * | 12/1999 |
| JP | 2000-048803 | A | 2/2000 |
| JP | 2001-167754 | | 6/2001 |
| JP | 2001-196038 | A | 7/2001 |
| JP | 2001-283828 | | 10/2001 |
| JP | 2002-124173 | | 4/2002 |
| JP | 2002-184390 | | 6/2002 |
| JP | 2003-077449 | | 3/2003 |
| JP | 2003-288876 | | 10/2003 |
| JP | 2004-103250 | | 4/2004 |
| JP | 2004-179073 | | 6/2004 |
| JP | 2005-019416 | | 1/2005 |
| JP | 2005-174814 | | 6/2005 |
| JP | 2005-174815 | | 6/2005 |
| JP | 2005-174816 | | 6/2005 |
| JP | 2005-251446 | | 9/2005 |
| JP | 2006-100054 | | 4/2006 |
| JP | 2006-156064 | | 6/2006 |
| KR | 2003-0033594 | | 5/2003 |
| KR | 2003-0060000 | | 7/2003 |
| WO | WO 97/38455 | * | 10/1997 |
| WO | WO 98/45887 | | 10/1998 |
| WO | WO 98/45888 | | 10/1998 |
| WO | 9910940 | A | 3/1999 |
| WO | WO 99/10941 | * | 3/1999 |

OTHER PUBLICATIONS

Oleesky, et al., Reinforcing Materials and Fillers, Handbook of Reinforced Plastics, 1964, pp. 120, 194-209, Reinhold Publishing Corp., New York.

* cited by examiner

CURRENT INTERRUPT DEVICE FOR BATTERIES

BACKGROUND

This invention relates to a device for an electrochemical battery which responds to an increase in temperature to break an electrical circuit within a cell, thereby stopping the flow of current and preventing an increase in pressure within the cell to an undesirable level.

Batteries are used to generate electrical energy to operate electronic devices. When batteries are misused or otherwise subjected to abusive conditions, the energy they are capable of producing can create potentially dangerous conditions. For example, exposure to high temperatures can create high internal pressures, and if the internal pressure becomes too great the battery housing can be forced open, and housing and internal components can be forcefully ejected. A battery with a metal with a relatively low melting point, such as a lithium battery, can also be heated sufficiently to melt that metal, causing an internal short circuit and runaway exothermic reactions. Exposure to abnormal or abusive electrical conditions can also generate a large amount of heat.

To prevent rupturing of the battery container and forceful ejection of battery sealing components, batteries often have pressure relief mechanisms, or vents, that will open to relieve the internal pressure at a lower level. However, this does not necessarily prevent the release of potentially dangerous fluids (e.g., corrosive electrolytes) or prevent the continued generation of heat within the cells. An example of a battery with a pressure relief vent in the cell container is disclosed in U.S. Patent Publication No. 2004/0157115 A1 and U.S. Pat. Nos. 6,348,281, 6,346,342 and 4,803,136, all incorporated herein by reference.

To prevent unnecessary opening of the pressure vents, fuses have been incorporated into some batteries, particularly higher energy batteries (e.g., rechargeable alkaline batteries such as nickel/cadmium batteries, primary and rechargeable lithium batteries with a variety of active positive electrode materials, and rechargeable lithium ion batteries). However, fuses permanently break the electrical circuit do not allow the battery to be used once the abusive condition has been removed, even if the battery has not been damaged. Examples of batteries with fuses also incorporated into the cells are disclosed in U.S. Pat. Nos. 4,879,187 and 4,188,460, which are incorporated herein by reference.

As an alternative to a fuse, other types of current interrupters have been used. Some of these respond to internal pressure and some respond to heat. The thermally responsive current interrupters can make use of bimetallic or shape memory alloy components that change shape when their temperatures exceed predetermined values, and some also incorporate a diode, such as a Zener, Schottky, or power rectifier diode, to generate additional heat if the current flow exceeds a desired maximum. Some current interrupters permanently break the electrical circuit, while some are reversible. Examples of batteries with such current interrupters are disclosed in the following U.S. patents, all of which are incorporated herein by reference: U.S. Pat. Nos. 6,037,071; 5,998,051; 5,766,793; 5,766,790 and 5,747,187. Additional examples are also disclosed in Unexamined Japanese Patent Publication No. 05-205,727. The batteries disclosed in these references have one or more disadvantages. They may require additional components, adding to the battery cost, complicating the manufacturing process, and often increasing the internal resistance, thereby adversely affecting battery performance, particularly under heavy discharge conditions (e.g., low resistance, high current and high power). Some do not include a pressure relief vent, so a separate vent is required. In some the operation of the current interrupter coincides with the operation of the pressure relief vent, so breaking the internal circuit does not serve to prevent venting of potential harmful fluids.

Some batteries have used positive temperature coefficient (PTC) devices, either instead of or in combination with a fuse or reversible circuit breaking device. When the flow of current exceeds a threshold limit in a PTC device, or the PTC device otherwise exceeds a threshold temperature, the resistance of the PTC device increases rapidly to reduce the flow of current to a very low level. This provides protection against electrical abuses such as external short circuits, overcharging and forced discharge. However, it does not completely break the electrical circuit between the positive and negative electrodes. The addition of a PTC device to a battery also has disadvantages similar to those of reversible circuit interrupters: increased cost, manufacturing complexity, and internal resistance.

An example of a cell according to the prior art and containing a pressure relief vent and a PTC is a primary $Li/FeS_2$ cell with a nonaqueous electrolyte, such as the cell shown in FIG. 1. Cell 10 is an FR6 type cylindrical $Li/FeS_2$ battery cell. Cell 10 has a housing that includes a container in the form of a can 12 with a closed bottom and an open top end that is closed with an internal cell cover, or sealing plate, 14 and a gasket 16. The can 12 has a bead or reduced diameter step near the top end to support the gasket 16 and sealing plate 14. The gasket 16 is compressed between the can 12 and the sealing plate 14 to seal an anode 18, a cathode 20 and electrolyte within the cell 10. The anode 18, cathode 20 and a separator 26 are spirally wound together into an electrode assembly. The cathode 20 has a metal current collector 22, which extends from the top end of the electrode assembly and is connected to the inner surface of the sealing plate 14 with a contact spring 24. The anode 18 is electrically connected to the inner surface of the can 12 by a metal lead (or tab) 36 (FIG. 2). The lead 36 is fastened to the anode 18, extends from the bottom of the electrode assembly, is folded across the bottom and up along the side of the electrode assembly. The lead 36 makes pressure contact with the inner surface of the side wall of the can 12. After the electrode assembly is wound, it can be held together before insertion by tooling in the manufacturing process, or the outer end of material (e.g., separator or polymer film outer wrap 38) can be fastened down, by heat sealing, gluing or taping, for example. An insulating cone 46 is located around the peripheral portion of the top of the electrode assembly to prevent the cathode current collector 22 from making contact with the can 12, and contact between the bottom edge of the cathode 20 and the bottom of the can 12 is prevented by the inward-folded extension of the separator 26 and an electrically insulating bottom disc 44 positioned in the bottom of the can 12. Cell 10 has a separate positive terminal cover 40, which is held in place by the inwardly crimped top edge of the can 12 and the gasket 16 and has one or more vent apertures (not shown). The can 12 serves as the negative contact terminal. An insulating jacket, such as an adhesive label 48, can be applied to the side wall of the can 12. Disposed between the peripheral flange of the terminal cover 40 and the sealing plate 14 is a positive temperature coefficient (PTC) device 42 that substantially limits the flow of current under abusive electrical conditions. Cell 10 also includes a pressure relief vent. The cell sealing plate 14 has an aperture comprising an inward projecting central vent well 28 with a vent hole 30 in the bottom of the well 28. The aperture is sealed by a vent ball 32 and a thin-walled thermoplastic bushing 34, which is compressed between the vertical wall of the vent well 28 and the periphery of the vent ball 32. When the cell internal pressure exceeds a predetermined level, the vent ball 32, or both the ball 32 and bushing 34, is forced out of the aperture to release pressurized gases from the cell 10.

Examples of Li/FeS$_2$ cells each having a pressure relief vent, a PTC device and a thermally responsive shape memory alloy current interrupter are disclosed in U.S. Pat. Nos. 4,975, 341 and 4,855,195, both of which are incorporated herein by reference. Disadvantages of cells containing PTC devices can include increasing cell internal resistance with increasing temperature before operation of the PTC, an increase in internal resistance after the PTC initially operates and then resets (returns to a "normal" resistance), and excessive time for the PTC to cool and reset after the heating source is removed.

In view of the above, an object of the present invention is to provide a battery that is safe even under abusive conditions, is easy and economical to manufacture, can completely break the internal electrical circuit to help avoid excessive pressure buildup and unnecessary opening of the pressure relief vent, and has good electrical characteristics even under heavy discharge conditions. It is also desirable for the break in the circuit to be rapidly and completely reversible, without a significant increase in internal resistance.

SUMMARY

The above object is met and the above disadvantages of the prior art are overcome by providing a battery with a cell closed by a sealing plate containing a pressure relief vent in which the sealing plate can change shape when exposed to a high temperature, thereby interrupting the electrical circuit within the cell at a temperature before the pressure relief vent opens.

Accordingly, one aspect of the present invention is an electrochemical battery comprising at least one electrochemical cell, the cell comprising a container with an opening; a positive electrode, a negative electrode, a separator and an electrolyte disposed within the container; a sealing plate for closing the opening in the container; and positive and negative terminals in electrical contact with the corresponding positive and negative electrodes, respectively. The sealing plate is a portion of an internal surface of the cell, comprises a pressure relief orifice that is closed under normal conditions to seal a fluid within the cell, is part of an electrical circuit between one of the electrodes and the corresponding terminal under normal conditions, is capable of changing from a first normal shape to a second shape to break the circuit between the electrode and corresponding terminal, without the pressure relief orifice becoming open, when the sealing plate has a temperature that increases from a normal level to an abnormal level that exceeds a predetermined first temperature value; and after moving from its first shape to its second shape is capable of returning to its first shape to reestablish the broken circuit when the sealing plate temperature returns to a normal level at or below the predetermined first temperature value.

A second aspect of the invention is an electrochemical battery comprising at least one electrochemical cell, the cell comprising a container with an opening; a positive electrode comprising an iron sulfide, a negative electrode comprising a lithium metal or lithium alloy, a separator and a nonaqueous electrolyte disposed within the container; a sealing plate for closing the opening in the container; and positive and negative terminals in electrical contact with the corresponding positive and negative electrodes, respectively. The sealing plate is a portion of an internal surface of the cell, comprises a pressure relief orifice that is closed under normal conditions to seal a fluid within the cell, is part of an electrical circuit between one of the electrodes and the corresponding terminal under normal conditions, is capable of changing from a first normal shape to a second shape to break the circuit between the electrode and corresponding terminal, without the pressure relief orifice becoming open, when the sealing plate has a temperature that increases from a normal level to an abnormal level that exceeds a predetermined first temperature value, and after moving from its first shape to its second shape is capable of returning to its first shape to reestablish the broken circuit when the sealing plate temperature returns to a normal level at or below the predetermined first temperature value.

These and other features, advantages and objects of the present invention will be further understood and appreciated by those skilled in the art by reference to the following specification, claims and appended drawings.

Unless otherwise specified, the following definitions and methods are used herein:

internal cell surface means a surface that defines a cavity within the cell in which the electrodes and electrolyte are disposed and that can be contacted a fluid originating within an electrode or the electrolyte; and initial deformation time means the amount of time, from the application of current to a sealing plate at room temperature, for the sealing plate to change shape, thereby breaking an electrical circuit.

Unless otherwise specified herein, all disclosed characteristics and ranges are as determined at room temperature (20-25° C.).

DESCRIPTION

Figure 1:
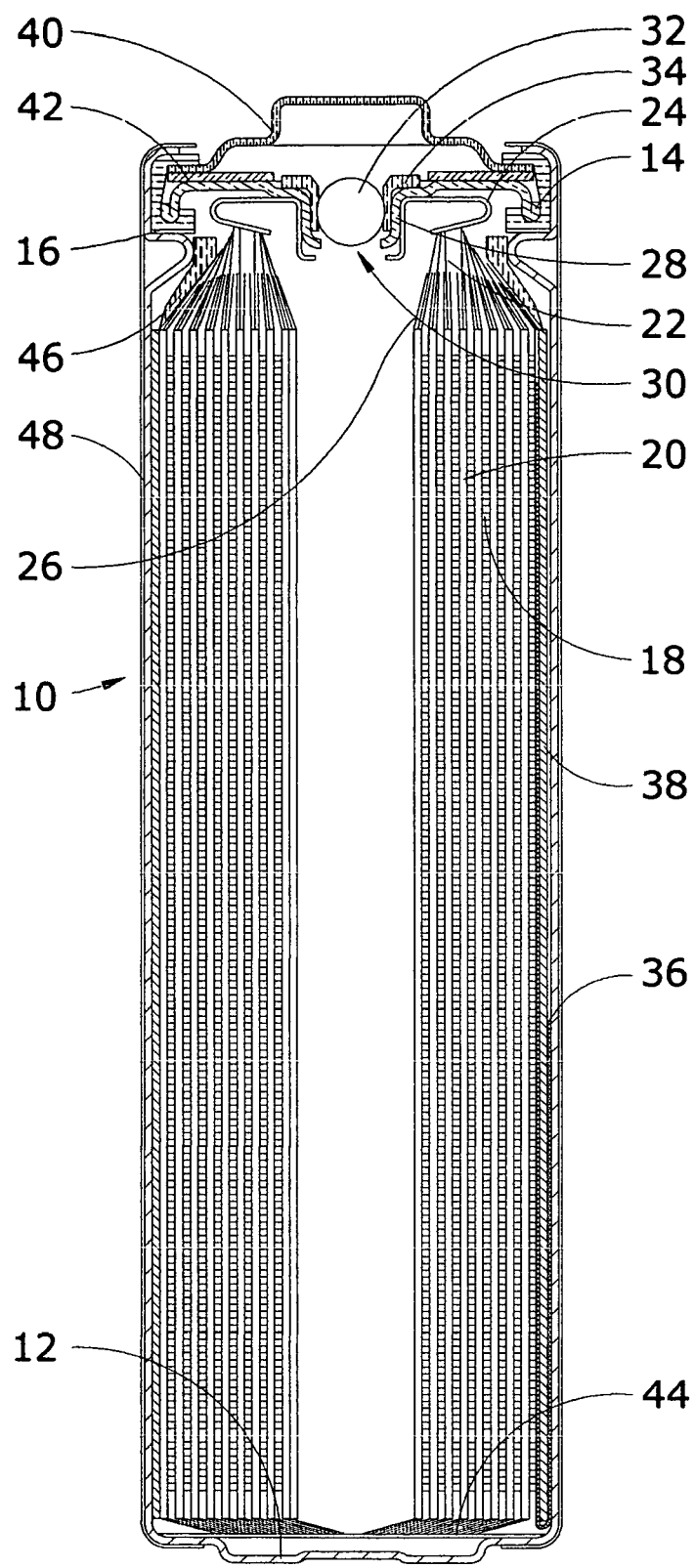
FIG. 1 is a full sectional view of a cell according to the prior art.

An embodiment of the invention is a primary cylindrical Li/FeS$_2$ battery, as described below. The battery has a cell container and electrode assembly similar to those in FIG. 1, but the top portion of the cell is modified as shown in FIG. 2.

Cell 110 (which is shown without a label or jacket around the side wall of the container) has a can 12 with an open top end closed with a gasket 16 and a modified sealing plate 114. The peripheral flange of positive terminal cover 40 is separated from the peripheral portion of the sealing plate 114 by an insulating washer 150 so the electrical circuit between the positive electrode 20 and the positive terminal cover 40 is through the current collector 22, contact spring 124 and sealing plate 114, with electrical contact between the sealing plate 114 and the terminal cover 40 being made in an annular area radially inside the insulating washer 150. Cell 110 optionally includes a resistive material 152 that will generate heat when the current flowing between the positive electrode 20 and positive terminal cover 40 exceeds a predetermined value, as explained below. In an alternative embodiment, a PTC device (not shown) can be disposed between the sealing plate 114 and positive terminal cover 40 as part of the electrical circuit between the positive electrode 20 and terminal cover 40. Although not shown in FIG. 2, cell 110 also has a pressure relief vent in the sealing plate 114, preferably in the central area 115. The pressure relief vent can be similar to that of cell 10 in FIG. 1, described above, but is preferably of a different design, such as a central aperture closed by a rupture membrane (as disclosed in U.S. Patent Publication No. 2005/0244706 A1, incorporated herein by reference) or a thin area (e.g., a coined groove) that can tear or otherwise break to form a vent aperture in the central portion 115 of sealing plate 114.

Figure 2:
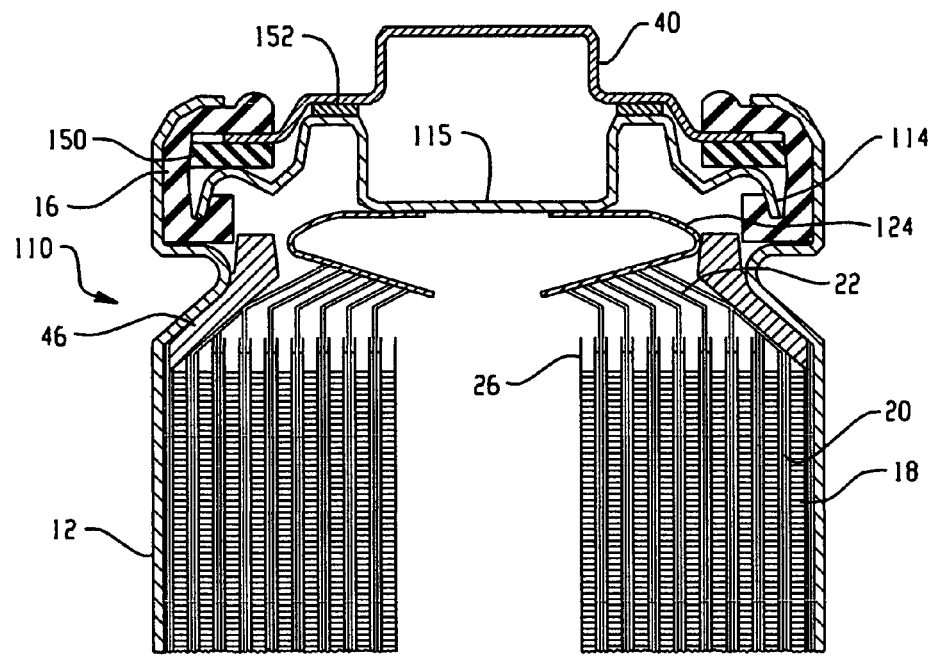
FIG. 2 is a partial sectional view of the top portion of a call according to the invention in a normal condition.
Figure 3:
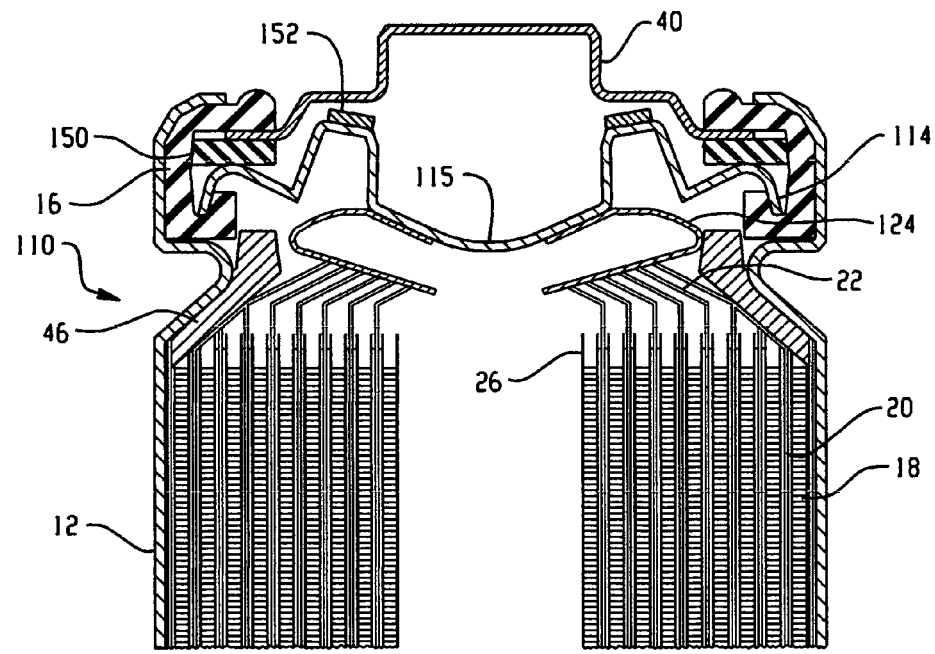
FIG. 3 is a partial sectional view of the top portion of the cell shown in FIG. 2 in an abnormal condition.

Cell 110 in FIG. 2 is shown in a normal condition. The sealing plate 114 is made from a material that, upon heating above a predetermined temperature, will deform in such a way as to break electrical contact with the terminal cover 40, as shown in FIG. 3. The predetermined temperature is preferably selected to be less than a temperature at which the internal cell pressure would cause the pressure relief vent to open. In this way, if the cell is subjected to an abnormal or abusive electrical condition that can cause internal heating within the cell, such as an external short circuit, abnormal charging or forced deep discharge, the electrical circuit can be broken to stop the heat generation before the cell vent opens. If the sealing plate 114 is made from a material that will return to its normal shape (FIG. 2) after cooling to or below the predetermined temperature, it may also be possible to continue normal use of the cell if the abnormal condition is removed.

If the cell 110 also includes a PTC, the predetermined temperature above which the sealing plate 114 would deform is preferably greater than the temperature at which the resistance begins to increase significantly. Including a PTC provides an additional current limiting feature; however, since the deformable sealing plate 114 of the invention can completely break electrical contact between the sealing plate 114 and the terminal cover 40, the additional complexity and cost of including a PTC may not be necessary.

Because the sealing plate is part of the electrical connection between the positive electrode and the terminal cover, it is made from a material with good electrical conductivity. In order to break the electrical connection, the material will also be one that causes the sealing plate to deform when its temperature above a predetermined maximum temperature, as a result of either exposure to heat from another source, inside or outside the cell, or excessive $I^2R$ heating from an abnormally high rate of current flow through the sealing plate. Suitable materials include shape memory alloys and bimetals.

A shape memory alloy is an alloy that can be deformed at one temperature but when heated or cooled returns to its previous shape. This property results from a solid phase transformation, between the Martensite and Ausenite phases. Preferred shape memory alloys have a two-way shape memory; i.e., the transformation is reversible, upon both heating and cooling. Examples of shape memory alloys include nickel-titanium, copper-zinc-aluminum and copper-aluminum-nickel alloys, with nickel-titanium being preferred. Manufacturers of nickel-titanium and other shape memory alloys include Specialty Metals, Shaped Memory Alloy Division (New Hartford, N.Y., USA), Memry Corporation (Bethel, Conn., USA), and Dynalloy, Inc. (Mesa, Calif., USA).

A bimetal is a material with at least two layers of dissimilar metals having different coefficients of thermal expansion. An example is a material with a layer of a nickel-chromium-iron alloy having a high coefficient of thermal expansion an a layer of a nickel-iron alloy having a lower coefficient of thermal expansion. Manufacturers of bimetallic switches include Texas Instruments (Dallas, Tex., USA), Madison Company (Branford, Conn., USA), and Otter Control Limited (Derbyshire, England). Materials can be selected to provide a sealing plate that will deform upon heating above a maximum normal temperature and will also have a relative low electrical resistance, at least below the sealing plate deformation temperature. The material selected will be stable when exposed to fluids contained within the cell, such as the electrolyte. Alternatively, the sealing plate can be coated with material that is stable in the internal cell environment to provide the desired stability. The coating can be any suitable material, applied by any suitable process, that adequately protects the internal surface of the sealing plate without introducing an unacceptably high resistance into the electrical circuit between the positive electrode and the terminal cover. In a preferred embodiment of the invention, the material selected for the sealing plate results in a rapid deformation of the sealing plate after it exceeds the predetermined maximum temperature. If desired, the selected material will also be one that can allow the sealing plate to return to its normal shape after cooling to a normal temperature.

For a battery with good electrical and good high current and high power discharge characteristics, it is desirable for the sealing plate to have a relatively low resistance. Preferably the sealing plate resistance will be no greater than about 0.04 ohm, more preferably no greater than about 0.03 ohm at room temperature. The resistance of the sealing plate may increase with increasing temperature; preferably the resistance will be no more than about 100 percent higher, more preferably no more than about 60 percent higher, at the deformation temperature than at room temperature. The sealing plate resistance can be measured by measuring the voltage drop across the plate when a constant current is applied. For example, a sealing plate can be put into an electrically conductive fixture having a shape, dimensions and spacing to simulate the cover assembly components with which the sealing plate will contact in the cell. One set of leads (current carrying and voltage sensing) can be welded to the top of the fixture, and another set can be welded to the bottom of the fixture. A constant current that will not cause significant heating of the sealing plate (e.g., 0.1 amp) is applied through the current carrying leads using a power supply, and the voltage drop is measured using a multimeter connected to the voltage sensing leads.

It is desirable for the sealing plate to deform at a temperature that will not produce a high enough internal cell pressure to open the cell vent, but not at a normal storage or operating temperature. In some embodiments of the invention, it is desirable for the sealing plate to deform sufficiently to break the circuit between the electrode and the cell terminal at a temperature between about 70° C. and 120° C. Preferably the minimum temperature at which the sealing plate will deform is about 80° C., more preferable about 85° C. Preferably the sealing plate will deform by the time it reaches 100° C. If the sealing plate deforms at too low of a temperature, use of the battery will be unnecessarily interrupted. If the sealing plate deforms at too high of a temperature, there a cell vent or fire can occur.

In order to avoid unnecessary opening of the cell pressure relief vent, it is desirable for the sealing plate to deform quickly. The initial deformation time can be measured when the sealing plate is subjected to a constant current. For cells used in consumer-replaceable batteries, the initial deformation time (the time from the initial application of the test current until the sealing plate deforms sufficiently to break the circuit between the electrode and the cell terminal) is preferably no longer than about 1.0 second, more preferably no longer than about 0.75 second, when tested at a constant current of 10 amps. The initial and subsequent deformation times can be measured using the resistance test fixture described above. A power supply is connected to the current carrying leads, with a 0.1 ohm resistor in series, and a data logger (e.g., an AGILENT® 34970A Acquisition/Switch Unit), with the acquisition rate set to no longer than 0.1 second per point, is connected across the 0.1 ohm resistor to measure the current across the resistor. A 10 amp constant current is applied shortly after the data logger is switched on. The initial deformation time is the duration of time from initial application of the current until the current across the resistor drops to essentially zero. The reset times (time for the sealing plate to cool and return to its normal shape, thereby reestablishing the circuit) and subsequent deformation times can also be determined by continuing the test. It is desirable that the average current over time be less than a critical value, which can be established for each cell type, to prevent overheating, which could lead to cell venting, for example.

The insulating washer between the peripheral flange of the terminal cover and the sealing plate can be made of any suitable dielectric material. Preferably the washer will be made from an elastomeric material that can provide a compression seal with the terminal cover and the sealing plate. Examples include polymeric materials such as polyethylene and polypropylene, with polypropylene being a preferred polymeric material.

Examples of a resistive material that can generate heat when current flowing therethrough exceeds a predetermined value include diodes, such as Zener, Schottky and power rectifier type diodes.

The contact spring can be made of a conductive metal with low resistivity, such as nickel plated stainless steel, that is chemically stable in the cell internal environment. It should also have good spring characteristics. Preferably the spring force constant (stiffness) will be sufficient for the spring to apply at least a minimum amount of force against the positive electrode current collector to minimize the contact resistance, without being so high as to damage the current collector or other cell components. The spring can be affixed to the sealing plate in any suitable manner that will maintain good electrical contact. For example, a central aperture in the contact spring can be affixed around the downward projecting portion of the sealing plate by an interference fit, or the contact spring can be welded to an internal surface of the sealing plate. An interference fit can simplify manufacturing, while a welded connection may provide lower internal resistance.

The cell container is often a metal can with an integral closed bottom, although a metal plate can be fastened to one end of a metal tube to provide a container with a closed bottom. The container is generally steel, plated with nickel on at least the outside to protect the outside of the can from corrosion. The type of plating can be varied to provide varying degrees of corrosion resistance or to provide the desired appearance. The type of steel will depend in part on the manner in which the container is formed. For drawn cans the steel can be a diffusion annealed, low carbon, aluminum killed, SAE 1006 or equivalent steel, with a grain size of ASTM 9 to 11 and equiaxed to slightly elongated grain shape. Other steels, such as stainless steels, can be used to meet special needs. For example, when the can is in electrical contact with the cathode, a stainless steel may be used for improved resistance to corrosion by the cathode and electrolyte.

The terminal cover should have good resistance to corrosion by water in the ambient environment, good electrical conductivity and, when visible on consumer batteries, an attractive appearance. Terminal covers are often made from nickel plated cold rolled steel or steel that is nickel plated after the covers are formed. Where terminals are located over pressure relief vents, the terminal covers generally have one or more holes to facilitate cell venting.

The gasket comprises a thermoplastic material that is resistant to cold flow at high temperatures (e.g., 75° C. and above), chemically stable (resistant to degradation, e.g., by dissolving or cracking) when exposed to the internal environment of the cell and resistant to the transmission of air gases into and electrolyte vapors from the cell. Gaskets can be made from thermoplastic resins. Resins used to make gaskets for non-aqueous cells can comprise polyphenylene sulfide and polyphthalamide and combinations thereof as base resins. The base resin and can be blended with modifiers to provide the desired gasket properties. Small amounts of other polymers, reinforcing inorganic fillers and/or organic compounds may also be added to the base resin of the gasket. A preferred base resin is polyphthalamide. In one embodiment, polyphthalamide can be used alone. An example of a suitable polyphthalamide resin is RTP 4000 from RTP Company, Winona, Minn., USA. In another embodiment an impact modifier is added to the polyphthalamide. For example, 5 to 40 weight percent of an impact modifier can be added; such a material is available as AMODEL® ET 1001 L from Solvay Advanced Polymers, LLC, Alpharetta, Ga., USA. Another preferred base resin is polyphenylene sulfide, to which from greater than 10 to no greater than 40, preferably from greater than 10 to no greater than 30, and more preferably at least 15 weight percent of an impact modifier is added; such a material is available as FORTRON® SKX 382 from Ticona-US, Summit, N.J., USA. To improve the seal at the interfaces between the gasket and other cell components, the gasket can be coated with a suitable sealant material. A polymeric material such as EPDM can be used in embodiments with an organic electrolyte solvent.

The anode of an FR6 type cell contains lithium metal, typically in the form of a sheet or foil strip. The composition of the lithium can vary, though the purity is always high. The lithium can be alloyed with other metals, such as aluminum, to provide the desired cell electrical performance. A preferred lithium alloy is a battery grade lithium-aluminum alloy comprising about 0.5 weight percent aluminum, available from Chemetall Foote Corp., Kings Mountain, N.C., USA. When the anode is a solid piece of lithium, a separate current collector within the anode is generally not used, since the lithium metal has a very high electrical conductivity. However, a separate current collector can be used to provide electrical contact to more of the remaining lithium toward the end of cell discharge. Copper is often used because of its conductivity, but other conductive metals can be used as long as they are stable inside the cell. A conductive metal strip, such as a thin strip of nickel or nickel plated steel, can be used to make electrical contact between the lithium anode and the can. This strip can be pressed into the surface of the lithium foil. The strip can be welded to the inside surface of the can, or it can be held firmly against the can to provide a pressure contact. Because lithium and lithium alloy metals are typically highly conductive, a separate current collector within the anode is often unnecessary in lithium and lithium alloy anodes. When an anode current collector is desired, the current collector can be made from a copper or copper alloy metal.

The cathode of an FR6 type cell contains iron disulfide as an active material. A preferred iron disulfide is a battery grade $FeS_2$ having a purity level of at least 95 weight percent, available from American Minerals, Inc., Camden, N.J., USA; Chemetall GmbH, Vienna, Austria; Washington Mills, North Grafton, Mass.; and Kyanite Mining Corp., Dillwyn, Va., USA. The $FeS_2$ can be milled and sieved to achieve the desired particle size distribution and remove large particles that could puncture the separator in the cell. The largest particles should be smaller than the thinnest coating of cathode material on the current collector. Preferably the average particle size is no greater than about 30 µm, more preferably less than about 20 µm, and most preferably. In addition the cathode often contains one or more conductive materials such as metal, graphite and carbon black powders. Examples of suitable conductive materials include KS-6 and TIMREX® MX15 grades synthetic graphite from Timcal America, Westlake, Ohio, USA, and grade C55 acetylene black from Chevron Phillips Company LP, Houston, Tex., USA. A binder may be used to hold the particulate materials together. Ethylene/propylene copolymer (PEPP) made by Polymont Plastics Corp. (formerly Polysar, Inc.) and available from Harwick Standard Distribution Corp., Akron, Ohio, USA, and G1651 grade styrene-ethylene/butylenes-styrene (SEBS) block copolymer from Kraton Polymers, Houston, Tex., USA, are suitable for use as a binder. Small amounts of various additives may also be used to enhance processing and cell performance. Examples include POLYOX®, a non-ionic water soluble polyethylene oxide from Dow Chemical Company, Midland, Mich., USA, FLUO HT® micronized polytetrafluoroethylene (PTFE) manufactured by Micro Powders Inc., Tarrytown, N.Y., USA (commercially available from Dar-Tech Inc., Cleveland, Ohio, USA), and AEROSIL® 200 grade fumed silica from Degussa Corporation Pigment Group, Ridgefield, N.J.

A cathode current collector may be required. Aluminum foil is a commonly used material. A mixture of the cathode materials in a solvent can be coated onto the aluminum foil using a suitable process, such as a roll coating process, followed by evaporation of the solvent. The coated aluminum foil can then be densified, by calendering, for example, and can also be dried prior to use.

Any suitable separator material may be used. Suitable separator materials are ion-permeable and electrically nonconductive. They are generally capable of holding at least some electrolyte within the pores of the separator. Suitable separator materials are also strong enough to withstand cell manufacturing and pressure that may be exerted on them during cell discharge without tears, splits, holes or other gaps developing. Examples of suitable separators include microporous membranes made from materials such as polypropylene, polyethylene and ultrahigh molecular weight polyethylene. Preferred separator materials for Li/FeS$_2$ cells include CELGARD® 2400 microporous polypropylene membrane from Celgard Inc., Charlotte, N.C., USA, and Tonen Chemical Corp.'s Setella F20DHI microporous polyethylene membrane, available from ExxonMobile Chemical Co, Macedonia, N.Y., USA. A layer of a solid electrolyte or a polymer electrolyte can also be used as a separator.

Electrolytes for lithium and lithium ion cells are nonaqueous electrolytes. In other words, they contain water only in very small quantities (e.g., no more than about 500 parts per million by weight, depending on the electrolyte salt being used) as a contaminant. Suitable nonaqueous electrolytes contain one or more electrolyte salts dissolved in an organic solvent. Any suitable salt may be used, depending on the anode and cathode active materials and the desired cell performance. Examples include lithium bromide, lithium perchlorate, lithium hexafluorophosphate, potassium hexafluorophosphate, lithium hexafluoroarsenate, lithium trifluoromethanesulfonate and lithium iodide. Suitable organic solvents include one or more of the following: dimethyl carbonate, diethyl carbonate, methylethyl carbonate, ethylene carbonate, propylene carbonate, 1,2-butylene carbonate, 2,3-butylene carbonate, methyl formate, γ-butyrolactone, sulfolane, acetonitrile, 3,5-dimethylisoxazole, n,n-dimethyl formamide and ethers. The salt/solvent combination will provide sufficient electrolytic and electrical conductivity to meet the cell discharge requirements over the desired temperature range. While the electrical conductivity is relatively high compared to some other common solvents, ethers are often desirable because of their generally low viscosity, good wetting capability, good low temperature discharge performance and good high rate discharge performance. This is particularly true in Li/FeS$_2$ cells because the ethers are more stable than with MnO$_2$ cathodes, so higher ether levels can be used. Suitable ethers include, but are not limited to acyclic ethers such as 1,2-dimethoxyethane, 1,2-diethoxyethane, di(methoxyethyl)ether, triglyme, tetraglyme and diethyl ether; and cyclic ethers such as 1,3-dioxolane, tetrahydrofuran, 2-methyl tetrahydrofuran and 3-methyl-2-oxazolidinone.

Specific anode, cathode and electrolyte compositions and amounts can be adjusted to provide the desired cell manufacturing, performance and storage characteristics, as disclosed, for example, in U.S. Patent Publication No. 2005/0112462 A1, which is incorporated herein by reference.

The cell can be closed and sealed using any suitable process. Such processes may include, but are not limited to, crimping, redrawing, collecting and combinations thereof.

The above description is particularly relevant to FR6 type cells, examples of which are disclosed in further detail in U.S. Patent Publication Nos. 2005/0079413 A1 and 2005/0233214 A1, which are incorporated herein by reference. However, the invention may also be adapted to other cell sizes (e.g., FR03 and FR8D425) and other types of cells, such as non-cylindrical (e.g., prismatic) cells, cells with other pressure relief vent designs, and cells having other electrochemical systems.

Batteries according to the invention can be primary or rechargeable batteries. The cells they contain can be lithium cells, lithium ion cells, or aqueous alkaline cells. The invention is particularly useful in lithium batteries because a complete interruption of the internal circuit can prevent continued internal heat generation that could lead to melting of the lithium metal and a runaway exothermic reaction in the cell. Examples of other lithium cells include Li/CuO, Li/CuS, Li/FeS, Li/MnO$_2$, and Li/MoS$_2$. Li/FeS$_2$ and Li/FeS batteries are especially preferred because the reduction in internal resistance made possible by the elimination of a PTC is more critical in lower voltage cells.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. A battery comprising:
   a container with an opening;
   at least one electrochemical cell having a positive electrode, a negative electrode, a separator and an electrolyte, said electrochemical cell disposed within the container;
   a terminal cover fitted within the opening;
   an insulating washer proximate to the terminal cover;
   a sealing plate forming an electrical circuit between the terminal cover and either the positive or negative electrode, said sealing plate having a pressure relief vent, a lower portion which defines an internal surface of the electrochemical cell and an upper portion extending through an aperture in the insulating washer to contact the terminal cover;
   a gasket compressed between the container and the sealing plate;

wherein the sealing plate cooperates with the gasket and the insulating washer to change shape at a predetermined temperature value so as to break the electrical circuit; and wherein the sealing plate maintains contact with either the positive or negative electrode irrespective of the shape of the sealing plate.

2. The battery of claim 1, wherein a contact member is attached to the sealing plate and either the positive or negative electrode to complete the electrical circuit.

3. The battery according to claim 2, wherein the contact member is affixed on the lower portion of the sealing plate by an interference fit.

4. The battery according to claim 2, wherein the contact member exerts spring force against the positive or negative electrode to minimize internal resistance.

5. The battery according to claim 4, further comprising a heat generating component.

6. The battery according to claim 5, wherein the heat generating component is at least one selected from the group consisting of: a diode, a Zener diode, a Schottky diode and a power rectifier.

7. The battery according to claim 6, wherein the pressure relief vent opens at a temperature that is greater than the predetermined temperature necessary to change the shape of the sealing plate.

8. The battery according to claim 1, further comprising at least one heat generating component selected from the group consisting of: a diode, a Zener diode, a Schottky diode and a power rectifier.

9. The battery according to claim 1, wherein the pressure relief vent opens at a temperature that is greater than the predetermined temperature necessary to change the shape of the sealing plate.

* * * * *